United States Patent

Gelin

[15] 3,644,132
[45] Feb. 22, 1972

[54] CONDUCTIVE MOLD COMPRISING A NONCONDUCTING SUPPORTING WALL AND A CONDUCTIVE GEL COAT APPLIED THERETO

[72] Inventor: Robert J. Gelin, Newark, Ohio
[73] Assignee: Owens-Corning Fiberglas Corporation
[22] Filed: Oct. 21, 1968
[21] Appl. No.: 821,158

[52] U.S. Cl. .......................... 117/5.1, 117/93.4 R, 117/201, 117/226, 164/46, 204/281
[51] Int. Cl. ......................................................... B29c 1/04
[58] Field of Search .......................... 117/5.1, 226, 201, 93.4; 204/281; 164/46; 249/134, 183; 25/DIG. 24; 18/DIG. 44

[56] References Cited

UNITED STATES PATENTS

| | | | |
|---|---|---|---|
| 2,733,160 | 1/1956 | Iler | 117/5.1 |
| 2,901,361 | 8/1959 | Meisel | 106/38.24 |
| 2,324,990 | 7/1943 | Carter | 106/38.24 X |
| 2,800,456 | 7/1957 | Shepherd | 117/221 X |
| 2,993,816 | 7/1961 | Blake | 117/226 |
| 3,414,424 | 12/1968 | Peeps et al. | 117/5.1 |
| 3,475,265 | 10/1969 | Santry | 117/5.1 X |
| 1,788,600 | 1/1931 | Smyser | 117/17 |
| 3,108,520 | 1/1962 | Renaud | 117/119.6 X |
| 3,058,165 | 10/1962 | Purvis | 264/257 X |
| 3,113,037 | 12/1963 | Watanabe | 117/93.4 |
| 3,236,679 | 2/1966 | Spiller et al. | 117/93 |
| 3,277,418 | 10/1966 | Norman et al. | 338/162 |
| 3,278,656 | 10/1966 | Dicks et al. | 117/17 |
| 3,327,685 | 6/1967 | Heyl et al. | 117/93.4 X |

FOREIGN PATENTS OR APPLICATIONS

| | | | |
|---|---|---|---|
| 481,025 | 2/1952 | Canada | 117/5.1 |
| 663,885 | 12/1951 | Great Britain | 117/93.4 |

Primary Examiner—William D. Martin
Assistant Examiner—Mathew R. P. Perrone
Attorney—Allen D. Gutchess, Jr. and Staelin & Overman

[57] ABSTRACT

An inexpensive conductive mold designed primarily for low-production output is provided. The mold includes an insulating supporting wall having an exposed surface covered with a conductive gel coat comprising a tooling base resin and an electrically conductive filler of a carbonaceous material in particle form, particles being in contact to form a conductive network throughout the gel coat. Ground conductors are molded into the supporting wall and are in contact with the conductive gel coat, the conductors being sufficient in number that the conductive gel coat has a resistance of not more than about two thousand megohms from any point on the mold surface to the nearest conductor.

2 Claims, 3 Drawing Figures

PATENTED FEB 22 1972 3,644,132

INVENTOR.
ROBERT J. GELIN
BY
Staelin + Overman
ATTORNEYS

CONDUCTIVE MOLD COMPRISING A NONCONDUCTING SUPPORTING WALL AND A CONDUCTIVE GEL COAT APPLIED THERETO

This is a division of copending application Ser. No. 509,797 filed Nov. 26, 1965, now abandoned.

This invention relates to the manufacture of reinforced plastic articles and to a conductive mold used in making the articles.

Reinforced plastic materials are now often used in many articles which were previously made of steel, aluminum, wood, etc. Such articles commonly are made with the aid of a mold having a finished surface to which a gel coat material is applied, with reinforced plastic laid up or applied over the gel coat to provide the proper wall structure for the article. Where a large number of articles are to be made, a metal mold is often used. However, in many, if not most, instances, the number of articles to be made do not warrant the additional expense of producing a metal mold. Consequently, a mold of reinforced plastic usually is made from a master form. The master form is often of wood or plaster and is handmade or shaped to the desired form. The mold is next made from the form by applying a tooling gel coat material on the form and laying up a structural backing of reinforced plastic. The final product then is manufactured from this mold in a somewhat similar manner, namely applying a finish or article gel coat material to the tooling gel coat surface of the mold and laying up a structural wall of reinforced plastic on the article gel coat. The article is then removed from the mold after hardening and can be trimmed, polished, etc., to produce the final product.

It has been found that the article can be made better and at lower cost if the article gel coat material is applied by means of electrostatic spraying. By applying an electrical potential between the mold and the spray, less waste of the gel coat material results and a smoother layer of the gel coat material with a more uniform thickness is produced. Because of the uniformity, actually a thinner gel coat can be applied since it is no longer necessary to apply a heavier coat to assure that the thinner portions will still have sufficient thickness. In addition, it has been found that with less of the gel coat material wasted and more applied to the mold, less time is required to achieve a given thickness of the gel coat and thus the overall production time of the article is reduced.

Heretofore, it has not been possible in most instances to achieve the advantages of electrostatic spraying, because the reinforced plastic molds are not conductive. Since metal molds are too expensive for many applications, especially for large products such as large boats, electrostatic spraying of the article gel coat material has heretofore not been possible in such instances.

In accordance with the present invention, it has been discovered that a conductive mold of reinforced plastic can be achieved to obtain the advantages of electrostatic spraying without the expense of a metal mold. This is accomplished by employing a special tooling gel coat which provides conductive properties for the entire mold. A conductor can be molded directly into the mold and in electrical contact with the conductive tooling gel coat to enable a desired charge to be placed on the mold.

The new conductive mold also has another important advantage, whether or not the mold is used with electrostatic spraying. When reinforced plastic molds are made from the master form, the finished mold surfaces are polished and waxed prior to making articles therewith. In the polishing and waxing operations, the molds commonly acquire a static charge which, in turn, attracts dust. This constitutes a major nuisance in the production of articles from the molds since the molds then have to be carefully cleaned before each use. However, with the conductive mold in accordance with the invention, if the mold is grounded even without electrostatic spraying, it has been found that the accumulation of dust thereon is substantially reduced and the problem of cleaning is minimized. This again contributes to a reduction in production time for articles made with the molds.

It is, therefore, a principal object of the invention to provide a nonmetallic conductive mold.

Another object of the invention is to provide a nonmetallic conductive mold which can be used to produce a reinforced plastic article with the aid of electrostatic spraying.

Still another object of the invention is to provide an improved method for making reinforced plastic articles by means of electrostatic spraying with nonmetallic molds.

Yet another object of the invention is to provide a reinforced plastic mold which is subject to a minimum of dust accumulation.

A further object of the invention is to provide a reinforced plastic mold having a conductive gel coat and a conductor in electrical contact with the gel coat.

Yet a further object of the invention is to provide a conductive gel coat material.

Other objects and advantages of the invention will be apparent from the following detailed description of a preferred embodiment thereof, reference being made to the accompanying drawings, in which.

Figure 1:
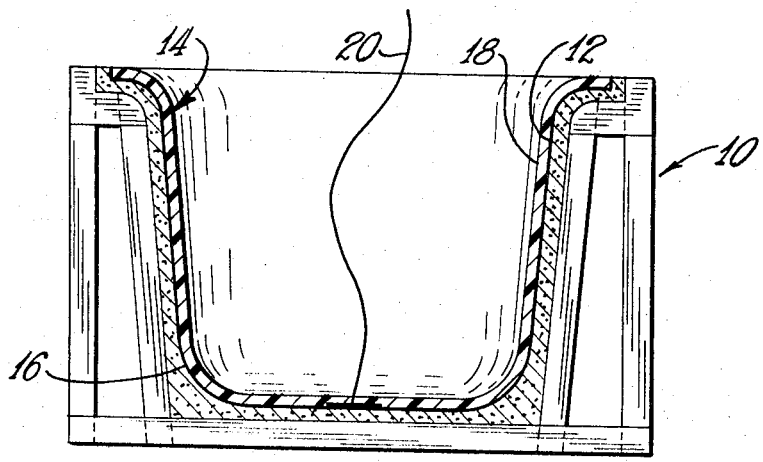
FIG. 1 is a somewhat schematic view in vertical cross section of a master form and a mold by means of which an article, specifically a laundry tub, is produced.

Referring particularly to FIG. 1, a master form 10 has a cavity 12 by means of which a mold 14 for the article to be produced is made. The form 10 commonly is made of wood or plaster or, as shown, a combination of both, with the cavity 12 machined and formed by hand to the desired shape. In this instance, the desired shape of the cavity 12 conforms to the inner surface of a laundry tub which is to be made in the manufacturing process. While a laundry tub is shown, the invention has even more applicability to larger molds which are even more difficult and expensive to make of metal. With the form completed and the surface 12 coated with a suitable releasing agent or wax, a tooling gel coat material and a catalyst are applied to the surface 12, preferably by spraying. After a tooling gel coat 16 is formed on the entire surface 12 to the desired thickness, a heavier supporting wall 18 of reinforced plastic is laid up. The reinforced plastic wall 18 preferably employs glass fibers as the reinforcement as is known in the art, with the fibers being in the form of woven strands, chopped filaments, or mat, by way of example. A conductor or leadline 20 is molded into the mold 14 with an end portion in contact with the tooling gel coat 16 to provide an electrical path therewith. With the conductive gel coat 16, the entire mold 14 is thereby made conductive and the mold can be used with electrostatic spray equipment in a manner similar to that which can be employed with metal molds.

Figure 2:
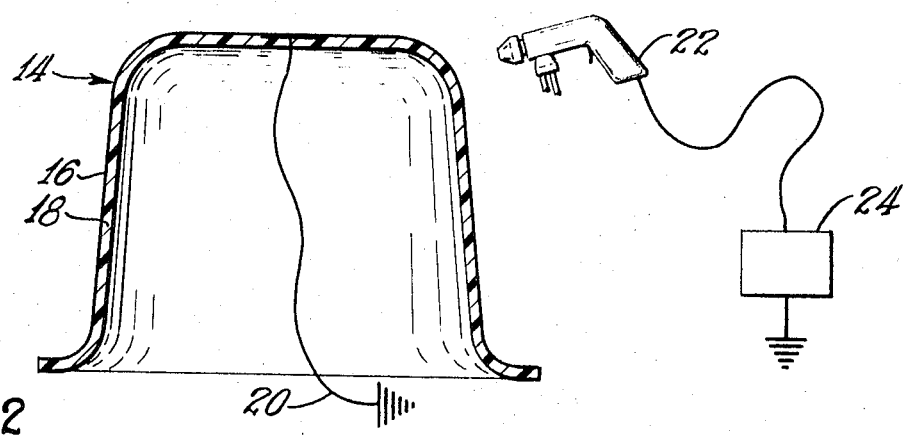
FIG. 2 is a view in vertical cross section of the mold made with the form of FIG. 1, and in position to receive an electrostatic spray of a gel coat material for the finished article.
Figure 3:
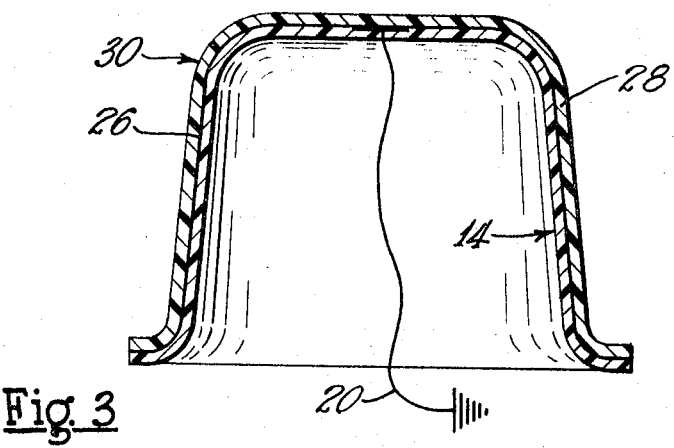
FIG. 3 is a view in vertical cross section of the mold of FIG. 2 with a completed laundry tub formed thereover and ready to be removed.

After the mold 14 has hardened and is removed from the master form 10, the surface is finished, by machining or grinding, and then polished. After a releasing agent or wax is applied and the mold is inverted as shown in FIG. 2, it is ready to manufacture a finished article, a laundry tub in this instance. A suitable electrostatic spray gun 22 applies finish or article gel coat material, including a catalyst combined at the spray gun, on the tooling gel coat 16 of the mold. The spray gun 22 is connected to a source of high voltage 24 which is connected to ground and the conductor 20 of the mold 14 is grounded. The spray of the article gel coat material from the spray gun 22 receives a charge from an electrode associated with the spray gun, with the charged spray particles then attracted to the mold 14 by virtue of the difference in potential established therebetween. While the mold is shown as being grounded in this instance, the electrical path can be reversed with the high voltage applied to the conductor 20 and the spray gun grounded. Further, a positive charge can be maintained on the spray gun or the mold and a negative charge on the other. In any event, the electrical potential of the mold 14, made by virtue of the conductive tooling gel coat 16 and the conductor 20, is different than the potential of the spray particles issuing from the spray gun 22.

The use of the electrostatic spray to apply an article gel coat 26 has a number of advantages. Considerably less gel coat spray is wasted by being deposited on surfaces other than the mold, which is particularly advantageous with the relative expensive gel coat material. In a number of tests conducted, for example, it has been found that the material efficiency increased from eleven to 20 percent by the use of electrostatic spraying. The material efficiency is determined by dividing the weight of the gel coat material on the mold by the weight of the gel coat material supplied to the spray apparatus. In addition, the gel coat material can be applied with a smoother finish and a more uniform thickness. The uniformity of the thickness of the coat enables a thinner overall coat to be employed since a heavier coat need not be applied in order to assure that the thinner portions will be of proper thickness. Also of importance is the fact that the gel coat material can be applied in less time because there is less waste.

After the gel coat 26 for the article has been applied and hardened, a structural wall 28 is laid up thereover in any suitable manner. This can constitute, for example, resin and chopped fibers, woven strand, or mat, similar to the supporting wall 18 of the mold 14. The material can be applied by spray apparatus, by hand, or by a combination of both. When the supporting wall 28 has hardened, the finished article, designated 30, is removed from the mold and is in substantially finished form with the possibility of some trimming or polishing, if required. The mold is then ready to receive another application of the article gel coat material and backing to produce another article.

The conductive tooling gel coat 16 is from 10 to 25 mils thick and preferably from 15 to 20 mils thick. If the gel coat is too thick, it will tend to crack and thereby blemish the surface of the finished article. On the other hand, if the gel coat is excessively thin, portions may be worn away when the mold is made and the surface is finished by machining or grinding, for example.

The conductive gel coat is made with a suitable commercially available tooling base resin and an electrically conductive filler material. This material preferably is of a carbonaceous nature and, in a specific form, acetylene black has been found to be particularly effective apparently because the individual particles of the acetylene black are elongated. Consequently, the particles form a conductive network throughout the tooling base resin much more effectively than would ordinary generally spherical particles of which powder is normally constituted. Other conductive materials, including other carbonaceous material, have been found to be effective to render the resulting gel coat conductive, although larger quantities are required.

The conductive particles can be mixed with the tooling base resin, in liquid form, in any suitable mixing device such as an Eppenback mixer. In mixing the powder and liquid, it is preferred that the mixing be just sufficiently long to produce reasonably uniform dispersion of the powder in the liquid. If the mixing is excessive, the individual conductive particles will be fully coated by the gel coat material so that the adjacent particles will not be in contact and proper conductivity will not result.

When acetylene black is employed, it preferably is present in an amount from 1 percent to 7 percent by weight. In an amount less than 1 percent, the resulting gel coat will not be sufficiently conductive. On the other hand, in an amount in excess of about 7 percent, the resulting gel coat will be excessively viscous and cannot be sprayed or otherwise handled properly. If the tooling base resin is exceptionally thin or fluid, however, the acetylene black can be used in an amount up to about 10 percent, by weight.

In the finished mold, the gel coat should provide a surface resistance of not more than 2,000 megohms between any point on the surface and the nearest conductor or grounding wire; preferably, the resistance is not more than about 150,000 ohms. With the acetylene black employed in the tooling gel coat, in the amounts specified above, resistances below 15,000 ohms have been attained. In general, the higher the resistance of the surface, the greater the number of conductors or ground wires required for satisfactory results.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A conductive, nonmetallic mold for forming bodies of reinforced plastic therefrom by means of electrostatic spraying, said mold comprising a supporting wall of reinforced plastic material of a generally predetermined shape corresponding to part of the shape of the body to be produced, a hardened conductive gel coat having a thickness from 10 to 25 mils on a surface of said supporting wall and effective to provide a smooth, exposed finish on said supporting wall, said conductive gel coat comprising a tooling base resin and an electrically conductive filler of a carbonaceous material in particle form with particles in contact with one another to form a conductive network throughout said conductive gel coat; said carbonaceous material being present in an amount from 1 percent to 7 percent, by weight, of the conductive gel coat, at least one conductor in electrical contact with said conductive gel coat and extending beyond said wall on the side opposite said conductive gel coat, said conductive gel coat having a resistance of not more than about 2,000 megohms from any point on the surface of the mold to the nearest conductor.

2. A conductive, nonmetallic mold according to claim 1 characterized by said carbonaceous material comprising acetylene black in elongate particle form.

* * * * *